B. ARNOLD.
MACHINE FOR MAKING SEINE NETS.
No. 36,499.
4 Sheets—Sheet 1.
Patented Sept. 23, 1862.
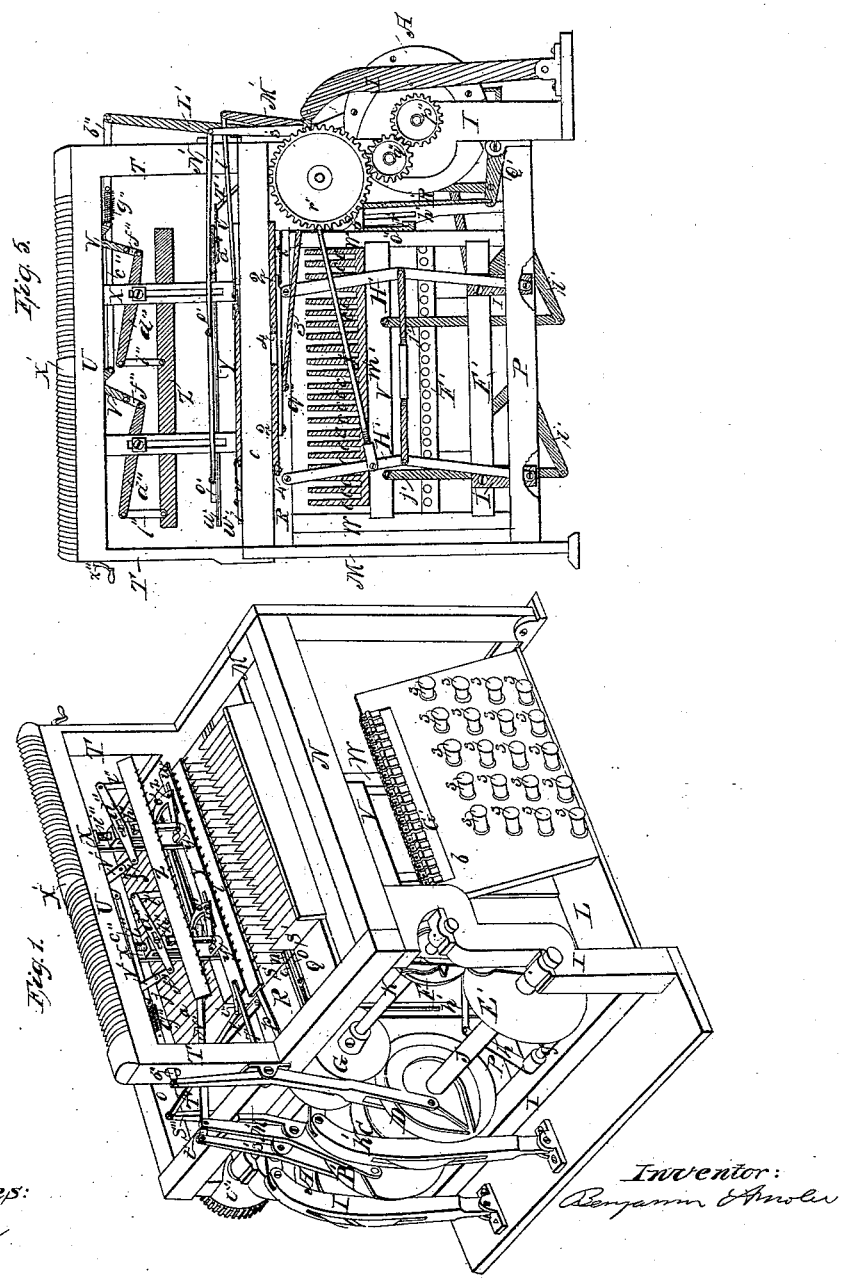

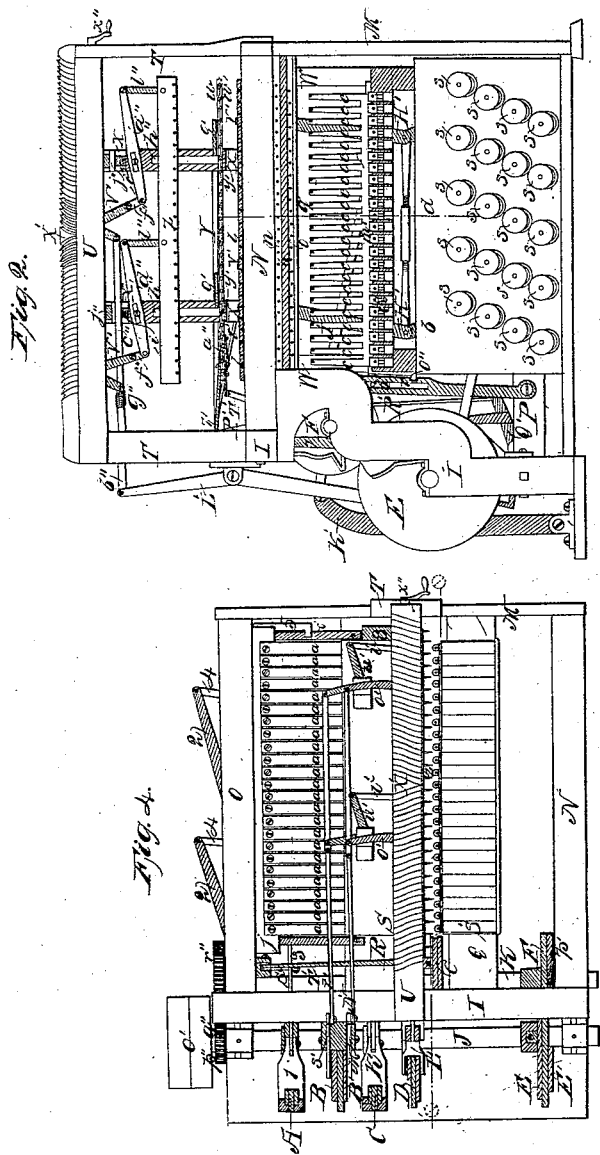

4 Sheets—Sheet 3.
B. ARNOLD.
MACHINE FOR MAKING SEINE NETS.
No. 36,499. Patented Sept. 23, 1862.
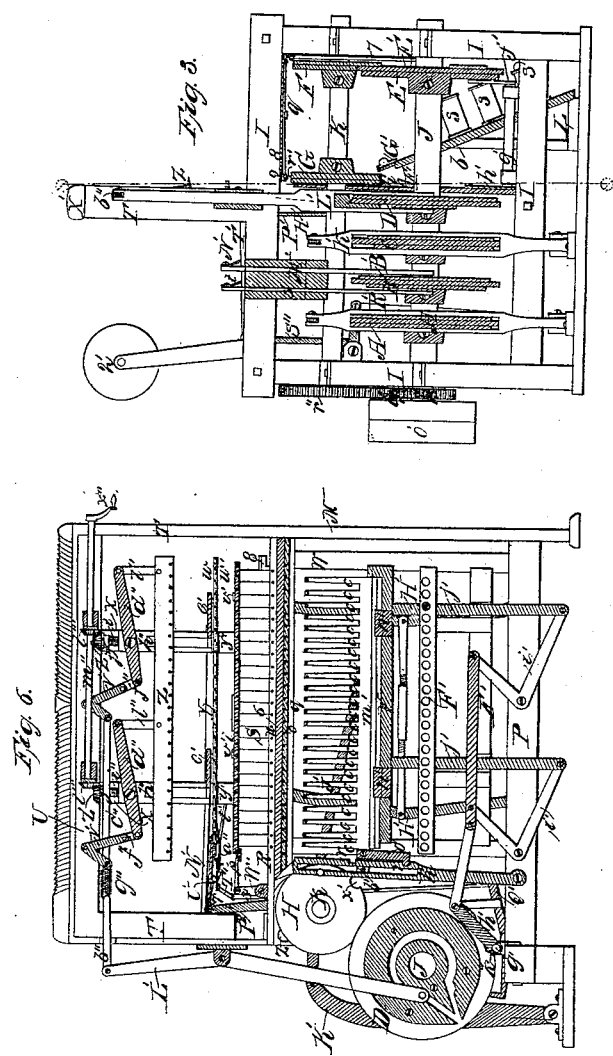

B. ARNOLD.
MACHINE FOR MAKING SEINE NETS.
No. 36,499. Patented Sept. 23, 1862.
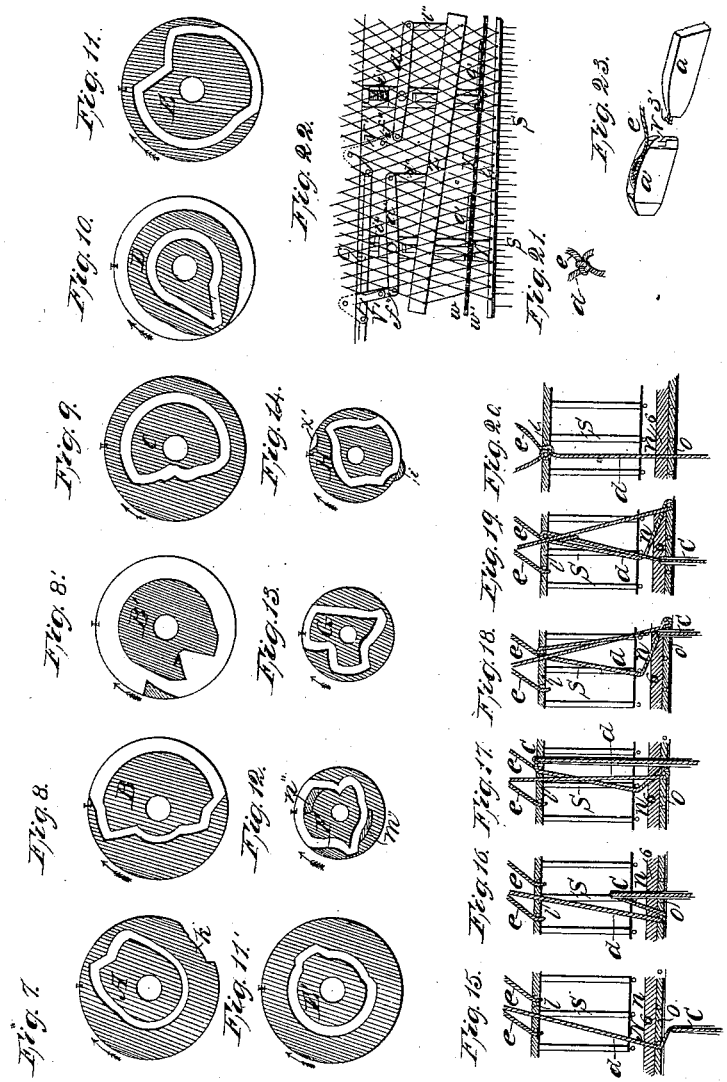

UNITED STATES PATENT OFFICE.

BENJAMIN ARNOLD, OF EAST GREENWICH, RHODE ISLAND.

IMPROVEMENT IN MACHINES FOR MAKING SEINE-NETS.

Specification forming part of Letters Patent No. 36,499, dated September 23, 1862.

*To all whom it may concern:*

Be it known that I, BENJAMIN ARNOLD, of East Greenwich, in the county of Kent, in the State of Rhode Island, have invented a new and Improved Machine for Making Nets and Netting; and I do hereby declare that the following is a full and correct description thereof, reference being had to the accompanying drawings, and to the letters of reference marked thereon.

The same letters refer to similar parts in all the figures.

Figure 1 is a perspective view of the machine. Fig. 2 is a front elevation. Fig. 3 is an end elevation showing the shafts and the cams upon them, with their levers to communicate the motions to the different parts of the machine. Fig. 4 is a top view. Fig. 5 is a back elevation. Fig. 6 is a vertical section of the machine, taken through in the direction of the red lines. (See Figs. 3 and 4.) Fig. 7 is cam A, that moves the twine-carriers in the rackways S S' through the loops of bobbin-twine; and also by a recess, $k$, in its edge closes the holding-pins $w$ upon the knots last tied. Figs. 8, 8' are both sides of cam B, one side of which moves the pin-bar $l$ backward and forward, and the other side of which, B', moves the pin-bar Y forward and back. Fig. 9 is cam C, that moves the carriage F' up and down. Fig. 10 is cam D, that moves the pin-bar $z$ up and down. Figs. 11, 11' are both sides of cam E, one side of which, E, moves the carriage V up and down. The other side, E', moves the bar $b$, that casts off the loops. Fig. 12 is cam F, that moves the pin-bar $o$ endwise. Fig. 13 is cam G, that moves the bar $m'$ on guide-carriage V endwise. Fig. 14 is cam H, that moves the pin-bar Y endwise. A recess, $x'$, in and projection $z'$ upon the edge of this cam give motion endwise to pin-bar $l$. The point marked # at the top of each cam in the drawings indicates that part of the cam that must be brought exactly over the center of the shaft in all of them at the same time to obtain their correct chronological order. Figs. 15, 16, 17, 18, 19, 20, show the different positions of the twines in making the knot. (These figures are drawn upon a larger scale to show the parts more distinctly.) Fig. 21 represents the knot. Fig. 22 shows the arrangements of the holding and feeding parts while tying a row of meshes larger at one end of the machine than at the other. Fig. 23 represents a twine carrier, $a'$, and the bar $a$ that moves it.

The frame-work of this machine is composed of a head or end frame, I, which contains the rotating parts, and which consists of two uprights having suitable bearings for the shafts J K and beams connecting these uprights; also, of a platform upon which the uprights stand, and which serves to hold the ends of some of the cam-levers. This head frame I is connected to another end frame, M, by beams—viz., a front beam, N, a back beam, O, and a lower beam, P; also by the bed-plates R Q. On the top and near the middle of each end frame are placed short uprights T T, which are connected together at their upper ends by the beam U, which sustains the parts connected with the feed-motion. Two guiding-rails, W W, are placed between the bed-plate R and the lower beam, P, upon which the guide-carriage V and the carriage F' slide up and down. From the upper beam, U, are two more guides, X X, extending down to the top of the race-ways S, upon which the carriages $h''$ $h''$, that hold the two pin-bars Z Y, slide. Two guide-rods, $i$ $i$, are also placed between the back beam, O, and bed-plate R to support the carriage $j$. A frame or board, $b$, is placed in front of beam P on a support, L, extending from one end frame to the other to hold the large spools of twine, $s$ $s$ $s$. The knots are made by forming loops of the twine from the large spools and passing through these loops carriers containing twine, as will hereinafter be described. The loops are formed from the "spool-twines" (as we may call them to distinguish them from the twines in the carriers) alternately to the right and left, and a carrier to the right of a spool-twine passing through a knot is tied with that carrier-twine. The next time the carrier to the left of the same spool twine passes through a new loop made from the same spool, and a knot is tied with that carrier twine. In this alternate right and left tying of the knots certain motions produced by the cams are the same for every row of knots, while the rest of the cam-motions are the reverse in tying the alternate row of knots to those for tying the previous row.

The first-named set of motions are produced by the cams upon the shaft J, which makes a complete revolution while the machine is tying each row. The second set of motions are made by the cams upon the shaft K, which makes but one-half of a complete revolution while the machine is tying one row. The other half of each cam is constructed so as to produce reverse motions while tying the next.

The parts and motions of the machine may be classified, to be more readily understood, as follows:

Class 1 comprises those parts and their motions that are used in forming the loops of the spool-twines. Figs. 15, 16, 17, 18, 19, 20 indicate the manner in which the loop is formed. The spool-twine $d$, before the first movement, lies in a straight line from the guide $c$ to the bar $y$, (not shown in these figures,) where it joins line $e$ by the last knot tied. Fig. 15 is the first position. The pin-bar $o$ has passed to the left relatively to the carriage V, which carries the guide $c$, and has carried the spool-twine $d$ with it. Fig. 16 is the second position. The guide $c$ has moved upward and to the right, and pin-bar $o$ has begun its reverse motion to the right. The twine between it and the end of the guide $c$ is being caught upon the stationary pin $n$, the ends of the guide being pressed toward the raceways S (in which the carriers are placed) at this time for that purpose, as the stationary pins do not project out so far as the pins in bar $o$. Fig. 17 is the third position. The guide $c$ has reached the extreme point of its upward motion, and by moving still farther to the right has carried the twine around the pin in bar $l$, which has moved forward to catch the twine well onto the pin. At the same time the pin-bar $o$ has continued its motion to the right and has carried the twine between it and the last knot over and free from the top of stationary pin $n$. Fig. 18 is the fourth position. The guide $c$ has moved down and has finished its motion to the right. The pin-bar $o$ has also completed its motion in the same direction, and the loop is ready for the first passage of the carrier $a'$, of which the ends are made tapering to go through the loops readily. Fig. 19 is the fifth position. The carrier has come forward, carrying its twine through the loop of spool-twine $d$, the guide $c$ has moved over to the left side, and the carrier has passed back to place through the loop last mentioned, and in so doing has crossed its twine $e$ over the twine $d$, reaching from the guide $c$ to the pin in bar $l$. The loop is now ready to be cast off of the pins in the bars $o$ and $n$ and drawn up. Fig. 20 is the sixth position. The loop has been cast off, as above stated, and drawn up around the pin in bar $b$, and when drawn up to a proper degree of tightness bar $l$ moves back, and drawing the pin out of the loop or knot leaves it to be made tight. The parts and motions used in making the loops are as follows: The cam E raises and lowers the carriage V, with the guides $c$ $c$ $c$, by the lever $f'$, which moves the rocker shaft $g'$ and lever $h'$ upon its other end, which is connected to the two knee-levers $i'$ $i'$, which move the carriage by the bars $j'$ $j'$. The cam G produces the motion endwise of the bar $m'$ and guides $c$ $c$ $c$ by means of the lever $k'$, which is pivoted to the lower beam, P, and has a slot in its upper part for the end of connecting-rod $l'$ to move in. This slot is to allow the carriage V to move up and down at the same time that the bar $m'$ is moved endwise. The guides $c$ $c$ are attached to the bar $m'$, which slides endwise in the clasps $n'$ $n'$ on the carriage V, and are tipped to and from the pins in making the loops by means of the bar $o''$, which is attached to one end of it, (see Fig. 6.) and whose lower end rests upon the lever $k'$, and is moved at the proper places in lever $k'$, in its ascent and descent by the notches $r$ $r$ in that lever, through which its end passes from one side to the other. The pin-bar $o$, which is held in a recess in the bed-plate R by a screw, $q$, fitting into a slot in its under side, is moved by the cam F through the lever $p'$, Fig. 4, which is connected to the lever $q'$ under the top girt of frame I. (See Fig. 3.) This lever is connected to bar by the rod $r'$. The pin-bar $l$ is moved forward by cam B and lever $s'$, which is connected by rod $t'$ to the knee-levers $u'$ $u'$, pivoted to the top of the raceways S, and which are connected to the bar $l$ by the rods $v'$ $v'$. This bar is also moved a little endwise by the lever W', which rests upon the edge of cam H, in which there is a recess, $x$, on one side and a projection, $z$, upon the other, the lever W' being held against the cam by spring $t$. (See Fig. 5.) The above-described motions for forming the loop are those used when making the knot commonly called "seine-knot" or "fisherman's knot;" but when the knot known as the "square knot" is preferred it is simply requisite to detach the pieces $n''$ $n''$. (Marked in red lines on cam F, Fig. 12.) The effect of this is to delay the opening of the loop which would otherwise take place across the aperture of the raceways S, until after the first passage of the carriers, by retarding the motion of the pin-bar $o$.

Class 2 comprises parts and motions employed in passing and returning the carriers of twine $a'$ through the loops of spool-twine and for casting the loops off of the pins when they are ready to be drawn up. The cams move their levers (excepting levers W' Q') by means of friction-rolls mounted on studs which project from the sides of the levers into the grooves in the sides of the cams. The sides of these grooves, being properly shaped, push the levers back and forth as the cams are turned. Cam A gives motion to the carriage $j$ by means of lever 1, which is connected to the two knee-levers 2 2 (see Fig. 5) by the bar 3, the levers 2 2 being connected to the carriage by the rods 4 4. From the carriage $j$ projects a row of bars, $a$ $a$ $a$, one for each division of the raceways S, in which they slide. These raceways S S' are represented as being made rectangular; but they may be made of other shapes, as oval or round, in which latter shape I made them at first, and their position is also shown as being horizontal; but I first used them in a vertical position and brought the finished netting out over the front beam; but, finding that the weight of the carriers filled with twine, which had to be raised and lowered for every row of knots tied, retard the operation of the machine, I changed them to the horizontal position, as shown. So in this particular I would not be understood as confining myself either to the shape or position of the raceways or carriers. The bars $a\ a\ a$ are long enough to reach to the front series of raceways S when the carriage $j$ is clear forward, and each bar has upon its end a prong or hook, 3', (see Fig. 23,) which catches into a recess in the end of the carrier $a'$, for the purpose of drawing them back after being pushed through the loops. When the ends of the bars $a\ a$ are raised, the hooks are released from the carriers and slide back without them. This raising of the bars is done by means of bar 5, (see Fig. 4,) fastened to the carriage $j$, and the end of which is lifted by the projection 8 on bed-plate R. The loops are cast off of the pins on which they are made by means of the bar 6, which is placed in the recess in the bed-plate E with pin-bar $o$, and moves on pins in the side of that bar. The slots in bar 6, in which these pins play, being made diagonal to the front of the bar, cause it to come out of the recess when pulled endwise and to return back into it when pushed in an opposite direction. These motions are given to the bar by cam E' through lever 7, which is connected to lever 8' on the under side of the top girt of the end frame, L. (See Fig. 3.) The other end of lever 8' is connected to bar 6 by rod 9, and the pins in bar $b$ are cleared of the knots by the bar moving back by a contrary movement of the parts that moved it forward, described in class 1.

Class 3 comprises the parts and motions used in drawing up the loops into knots; also, for taking up the netting after a row of knots has been tied preparatory to tying another row. The drawing up of the loops and knots is done by bar on carriage F', which slides up and down on the guides W W. The nipper bar G' may be placed on carriage F' in place of bar F', in which case the carriage will require twice as much length of motion up and down as will be necessary if placed as shown. The nippers are made in two parts hinged together. The upper part, being bent at a right angle, or nearly so, has two holes in it, one on each side of the angle, for the twine to pass through. They are fastened to the bar by the lower part and in such a position as to bring the edge of the bar half-way, or nearly so, between the hole nearest the hinge and the angle, so that the twine that passes from the lower hole to the upper on the under-side shall be liable to be pinched against the bar when the top of the pincher is drawn down by the twine in the bar on carriage F'. Carriage F' is moved by the jointed levers H' H', (see Fig. 5,) which are pivoted at their upper ends to bed-plate R and connected at their lower ends to the carriage by plates I' I'. These jointed levers are connected by rod J' to the cam-lever K', which is moved by cam C. The bar Y, which holds the last row of knots, is made in two parts, $w\ w'$, one of which slides upon the other. Each one of these parts has a row of pins in its edge corresponding in number and distance apart with the raceways S. The pins in the upper part of the bar are bent down slightly over the lower part, and those in the lower part are bent up a little, so that when the upper part is slid endwise upon the other the pins in it will come in contact with those in the other part. Between these two rows of pins the twine of the last mesh is held close to the last row of knots, which are drawn up snug to the front of the pins by bar Z at the upper end of the mesh. This bar Y has a motion back and front, and also endwise. The first is given by cam B' and lever M', which connects by rod N' to the knee-levers $o'\ o'$, pivoted to the lower ends of the carriages $h''\ h''$, and which move the bar by means of the pins $z\ z$ in their angles, working in the slots $y\ y$ in the bar. These slots are made to allow the bar Y to slide endwise by motion given to it by cam H, acting upon lever P', which is connected to the bar Y by rod 7'. The motion of the upper part, $w$, of the bar upon the lower is caused by the recess $k$ in the edge of cam A, which receives the end of the lever Q', which is connected by the rod R' to the knee-lever S'', the upper end of which is connected by the bar T' to the knee-lever U', which is pivoted to the upper part of bar Y, and has one end connected to the lower part of $w'$ by rod $a''$, which has a screw-thread upon it and a nut fitted to it, so that it can be adjusted to bring the pins in the two parts of the bar nearer together or farther apart as the twine used is fine or coarse. The bar Z, which draws up the finished netting, is moved up and down by cam D acting upon lever L', which is connected by the rods $b''\ c''$ to the knee-levers V' V', which are pivoted to the top beam, U, (see Fig. 6,) and whose lower ends are connected to the levers $d''\ d''$ by short straps $f''\ f''$, and the levers $d''\ d''$ are connected to the bar Z by the rods $l''\ l''$. The spring $g''$ on the connecting-rod $b''$ is to allow the cam-lever L' to be moved its usual distance by the cam D whether the mesh being tied is large or small, for the smaller the mesh the less will be the motion downward of bar Z; but in moving up it always goes so far as to bring the long arms of the knee-levers V' V' and straps $f''\ f''$ nearly in straight lines with each other. By these means the whole strain of holding the netting while the knots are being tightened by bar F' is taken off of lever L' and thrown directly upon beam U.

Class 4 will explain the parts and motions for regulating the size of the meshes. The two bars Y Z before mentioned are placed upon the carriages $h''\ h''$, the bar Z being placed on them near their tops, and the bar Y sliding in standards Y' Y' at their lower ends. The carriages $h''\ h''$ are moved to and from or held at a certain distance from the pin bar $l$ by the screws $i'' i''$, which screw into the upper ends of the carriages, and are held by the standards $j'' j''$, which are firmly fastened to the slides $X X$, and have upon their upper ends bevel gear-wheels $Z' Z'$, which mesh into the gear wheels $l''' l'''$ on rod $m''$, which extends out through the end of beam U, and has a crank, $x''$, on it to turn it by. The use of the screws $i'' i''$ and the gear wheels is to regulate the size of the meshes or lengths of twine between the knots, which may be done by turning the crank $x''$ without stopping the machine. The distance of the bar Y, which holds the last row of knots from the pin in bar $l$, around which the next row of knots will be drawn up, governs the length of the sides of the meshes, and by raising and lowering the carriages $h'' h''$ by the screws $i'' i''$ the sides of the meshes are lengthened or shortened. The bar Z requires to be held at about twice the distance from bar Y that bar Y is held from bar $l$, as there is a whole mesh between them, while there is only one-half a mesh between bar Y and pin-bar $l$. (See Fig. 22, where the netting and twine are shown by red lines.) This relative distance between the bars is maintained through all the different sizes of mesh without any other adjustment beyond turning the crank $x''$ by pivoting the levers $d'' d''$ to the carriages $h'' h''$ at about one-third of their length from the end by which they are moved. By this arrangement, when the distance between bar Y and bar $l$ is increased—say one-fourth of an inch—by moving the carriages $h'' h''$ up that distance the middle pivots of the levers $d'' d''$ are also raised up that same distance, and as the short ends of the levers are held at a fixed distance from beam U, the long ends will draw up the bar Z a distance in proportion to their lengths, and will thus maintain its proper position relative to the other bars.

By loosening one of the standards $j''$ and turning one of the screws $i''$ alone, its carriage may be set lower than the other, so that the size of the meshes shall decrease regularly from one side of the netting to the other. (See Fig. 22.) This feature of the machine is very useful in making nets of that class which includes "scoop-nets," "fyke nets," nets for boiling vegetables in, nets for protecting fruit on the trees from birds, and those worn on the head by young ladies to confine the hair, with many others that are made in the shape of a bag or tapering tunnel, as they can be cut off and put together without gores or making waste in cutting up the netting. The two cut edges being brought together and fastened, the small meshes will form the small end of the net.

I have avoided mainly the use in my machine of springs or weights for producing the return motions or the return of parts to their places after being moved by the cams, using positive motions produced by the same cams instead, though many of these motions may be given by springs or weights, but with less certainty of operation.

The operation of the machine and sequence of the motions are as follows: The twines (see Fig. 2, red line $a$) are threaded from the spools $s s$ up through the nippers G', then through the bar on carriage F', (if the nippers are not placed on carriage,) then up through the holes in the upper ends of the guides $c c c$, across the interval left between the two series of raceways S S' to the bar Y, where it is connected to the twine from the carriers in the raceways and fastened to the last row of knots, motion being now given to the main shaft J by a belt on the pulley $o'$, the gear-wheels $p'' q''' r''$ communicating motion to the shaft K and its cams. The cam F moves the pin-bar $o$ endwise, and the pins pass by the ends of the guides $c c$. (See Fig. 15.) Then the cam E moves the guide-carriage V upward. As the guides $c c$ move upward their upper ends are pressed toward the raceways S (when the stationary pins $n n$ catch the twine) by the end of bar $o''$ passing through a notch, $r$, in lever $k'$ and sliding up on the front side of that lever; but when coming down the same end passes a notch, $r$, at the upper end of the lever $k'$ and passes down on the back of that lever, which tips the upper ends of the guides away from the raceways and keeps them clear of the loops. As the guides $c c c$ pass up and around the pins in bar $l$, (see Fig. 17,) that bar is moved forward to catch the twine on its pins by cam B'. The guides $c c$ are moved sidewise by the cam G at the same time the pin-bar $o$ has begun its motion back, and has carried that portion of the twine that lies between the pin of that bar and bar Y over and clear of the stationary pins $n n$, (see Fig. 17,) and that part of the twine between bar $o$ and the ends of the guides $c c$ is caught upon the stationary pins $n n$. By a reverse motion of its levers the guide-carriage is moved down until their ends are over bar 6, at the same time finishing its motion endwise, so that the guides $c c$ (see Fig. 18) hold the twines in proper position for the carriers to pass. The bar $o$ has also finished its motion endwise, opening the loops (when tying the seine knot) for the carriers $a' a'$. The carriage $j$ is now moved forward by cam A pushing the carriers in the raceways S through the loops into the raceways S' by means of the bars $a a$. When the carriers are most through the loops, the end of bar 5 on carriage $j$ rises upon the projection 8 on the bed-plate R, and, tipping the carriage $j$, raises the ends of the bars and releases the hooks from the carriers, allowing the bars to be drawn back without them, and when the bars are far enough back to admit of the twines in the guides $c c$ passing the openings in the raceways the guides are moved over to the other side of the loops, (see Fig. 19,) when carriage $j$ again brings forward the bars $a a$, the ends of which are raised, as before, by bar 5 and projection 8; but, the carriage $j$ being pushed a little farther forward than before, the end of bar 5 passes clear over projection 8 and falls down, passing under it as it goes back, tipping the carriage $j$ down and catching the hooks into the carriers $a'a'$, so that they are drawn back by a reverse motion of the carriage through the loops, which are now ready to be cast off of the pins in bar $o$ and the stationary pins $n$ $n$, which is done by the operation of cam E. Cam C now pushes down the bar F', through which the twines pass, and draws upon them the nippers G', closing by the action of the twines upon them, cause the loops to be drawn up around the pins in bar $l$, when the bar $l$ is moved back by its cam and the pins are drawn out of the knots, and, carriage F' being carried a little farther down, the knots are drawn tight.

By the straightening of the jointed or toggle levers H' H' any desired amount of strain may be thrown upon the knots to tighten them. When this strain has been removed by the reverse motion of the levers, the cam D pushes down the bar Z. At the same time the cam B' pushes the bar Y forward, so as to bring the netting out clear of the pins in bar Z, and the bar Y is also moved endwise at the same time by cam H, so as to bring the netting right for the pins in bar Z to catch under the row of knots that lie between the bars Y and Z. When bar Z reaches bar Y, the latter begins its motion back, carrying the netting onto the pins in bar Z, which at that time begins its motion upward, and as bar Y continues to pass back the two parts $w w'$ of the bar are slid upon each other endwise, so as to open their pins and release the twines held between them by means of the recess $k$ in cam A. Bar Z continues its motion upward and draws up the netting until most up to place, when bar Y comes forward again, and taking the twines just above the row of knots tied last between its pins (having, while it was back, moved endwise, so as to be in the right position) they are closed, and bar Z in finishing its motion upward draws the knots up close in front of the pins in bar Y. After the pin-bar $l$ moves back and before it comes forward again it is moved a little endwise, so that the pins may be on the proper side of the carrier-twines, which lie in the notches in the tops of the raceways S by the cam H. The return motion of carriage F', after having drawn the knots tight, is made just so fast as the twine is required to form the next row of loops. This keeps the twine snug around the pins while the loops are being formed. The finished netting is taken up over the top beam, U, upon which is put a common cloth-spreader, X', to prevent the netting from drawing in too much toward the middle of the beam. From the spreader it is taken to the reel Q', and may be wound up around it or passed over and received in a pile on the floor or back of the machine, which may be boarded over to receive it.

Having thus described my invention and the manner of operation, I observe that I do not confine myself to the precise manner in which the various implements are operated, as these may be modified or different modes may be substituted, (those above described I consider the best when so many movements are produced, all relative to and in combination with each other,) nor to the particular knots specified, as similar alterations to that employed in changing from the seine-knot unto the square knot, or slight modifications, may produce others; but

What I do claim, and desire to secure by Letters Patent, is—

1. The arrangement and combination, substantially as described, of the various implements employed to form a loop, viz: the bar $m'$, with its row of guides $c\ c\ c$, and the bars $l$ and $o$, with their pins.

2. The bag Y, with its double row of pins, for the purpose of holding the netting, as set forth, and when constructed substantially as described.

3. The combination of the regulating-screw or screws $i''$ with the levers $d''$ and V', for the purpose set forth, when arranged substantially as described.

4. The carriage $j$, with its row of bars $a\ a$, in combination with the raceways S S' and the thread-carriers $a'$, when arranged substantially as described, for the purpose set forth.

5. A machine constructed and operated, substantially as described, for making a net, whether the knot used in tying the meshes be the "seine" or "weaver's" knot, so called, or the knot commonly known as the "square" knot.

BENJAMIN ARNOLD.

Witnesses:
D. W. VAUGHAN,
HENRY EARLE.